Nov. 28, 1944.    H. BANY    2,363,850
CONTROL EQUIPMENT FOR PRIME MOVER ELECTRIC GENERATING PLANTS
Filed Nov. 22, 1941    2 Sheets-Sheet 1

Inventor:
Herman Bany.
by Harry E. Dunham
His Attorney.

Patented Nov. 28, 1944

2,363,850

UNITED STATES PATENT OFFICE 2,363,850

CONTROL EQUIPMENT FOR PRIME MOVER ELECTRIC GENERATING PLANTS

Herman Bany, Lansdowne, Pa., assignor to General Electric Company, a corporation of New York Application November 22, 1941, Serial No. 420,148

9 Claims. (Cl. 290—44)

My invention relates to control equipments for prime mover electric generating plants and particularly to an equipment for controlling the operation of a plant comprising an alternating current synchronous generator driven by a fluid operated prime mover such as a wind turbine, the propeller of which is driven by a fluid the velocity of which varies over a wide range.

One object of my invention is to provide an improved control equipment for starting up such a plant when the velocity of the fluid driving the prime mover is sufficient to cause the plant to generate a predetermined amount of electric power, for limiting the power output of the plant when the velocity of the fluid driving the prime mover is in excess of a predetermined amount, for temporarily shutting down the plant under certain abnormal conditions such as when the velocity of the fluid is above a predetermined maximum value and also when it decreases to a value which is not sufficient to cause the plant to generate a predetermined amount of electric power, and for shutting down the plant completely under certain other emergency conditions such, for example, as when the turbine speed exceeds a predetermined value or the generator falls out of synchronism.

Figure 1:
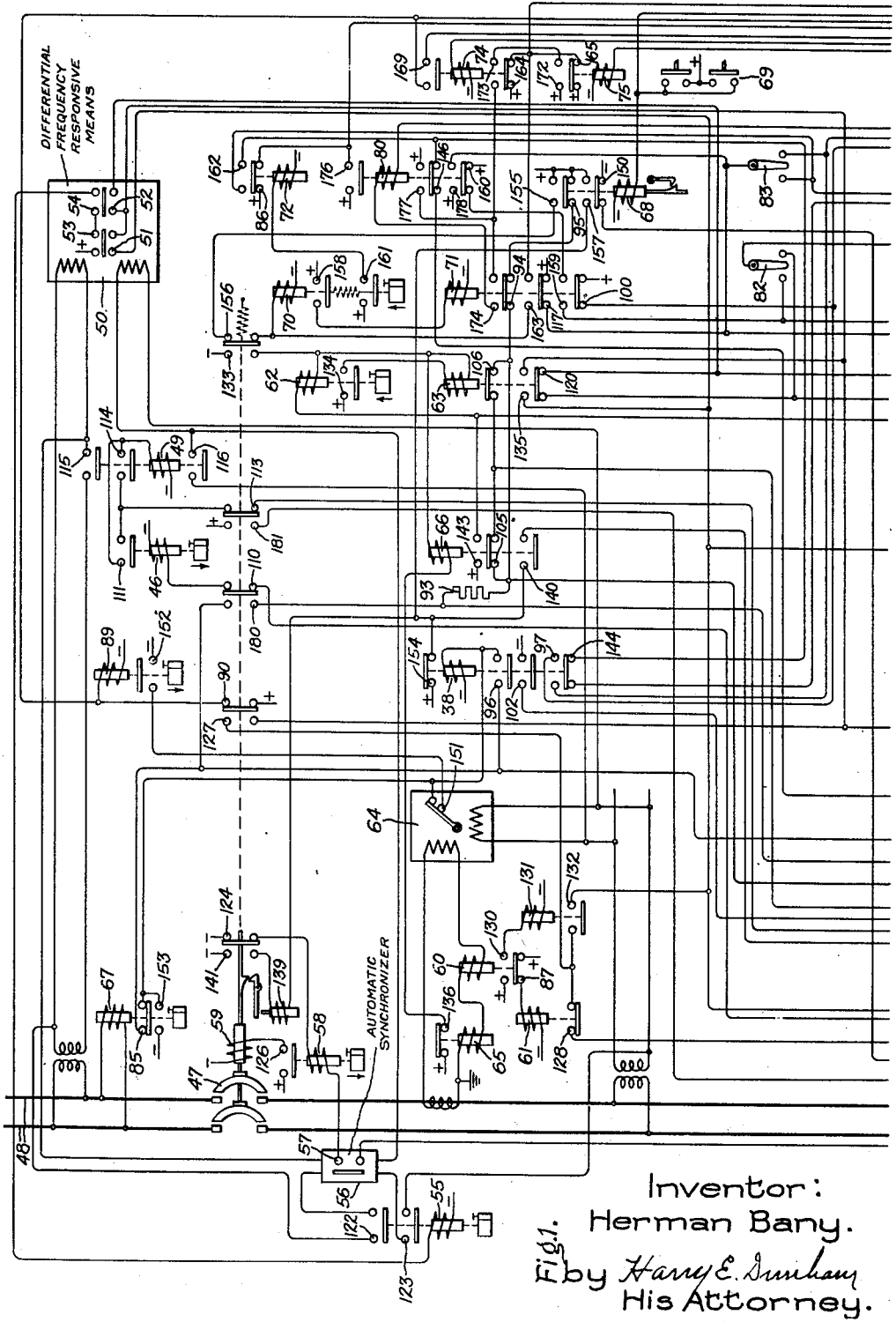
Figure 2:
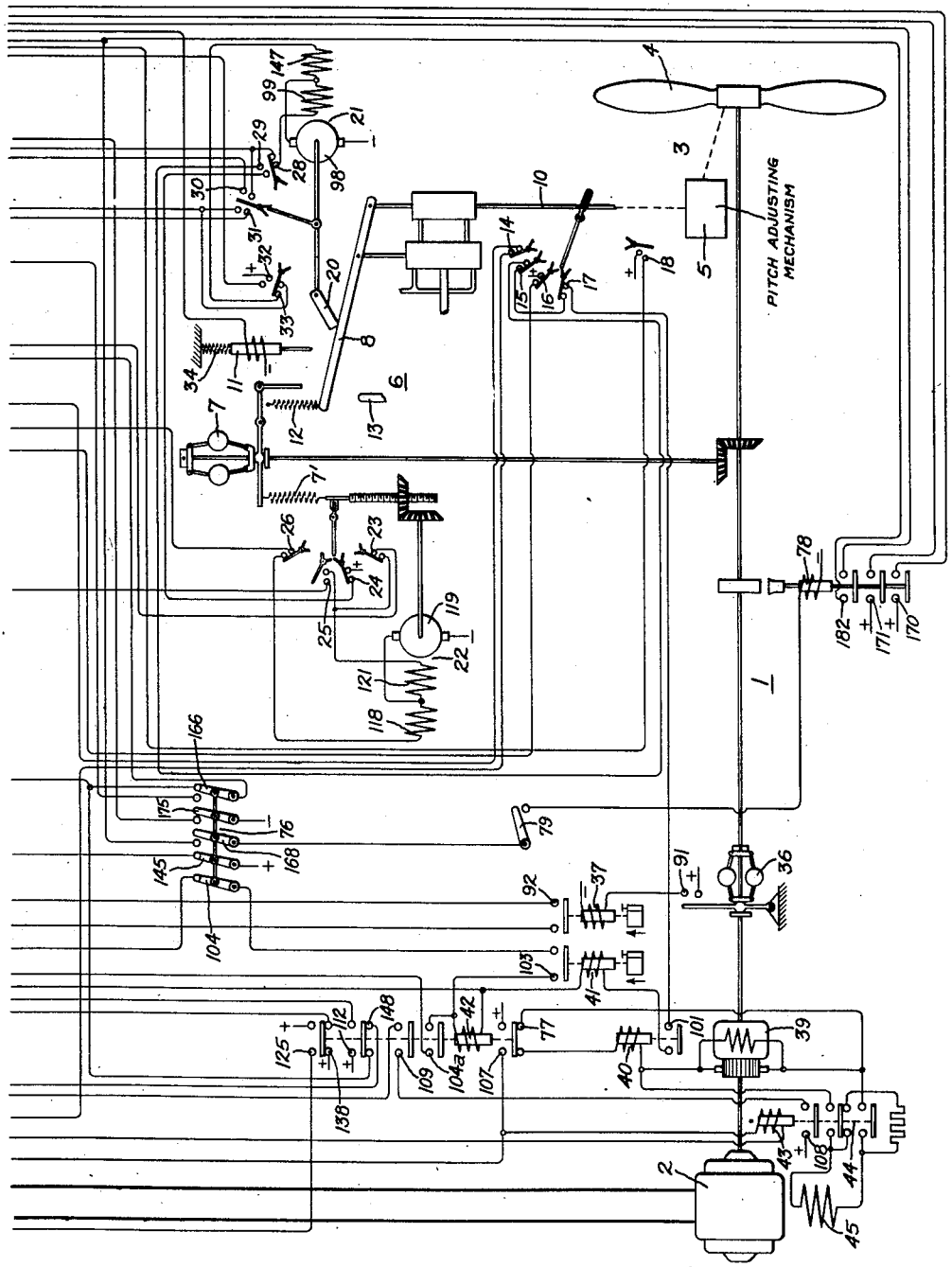

My invention will be better understood from the following description when taken in connection with the accompanying drawings, Figs. 1 and 2 of which when combined by placing Fig. 1 above Fig. 2 diagrammatically illustrate a control arrangement for a wind turbine-driven alternating current generator, and the scope of my invention, which is embodied in the disclosed control arrangement, will be pointed out in the appended claims.

Referring to the drawings, 1 represents a prime mover dynamo-electric plant comprising an alternating current generator 2 driven by a wind turbine 3. The turbine 3 includes a propeller 4 and suitable mechanism 5 associated therewith for varying the angle of the propeller blades. This blade angle adjusting mechanism 5, which may be of any suitable construction, examples of which are well known in the art, is controlled by means of a speed governor 6 which includes the flyballs 7 driven in any suitable manner at a speed proportional to the speed of the propeller 4. The flyballs 7 operate against the tension of an adjustable spring 7'. The position of the flyballs 7 controls the position of a movable member 8 which, in turn, controls a fluid pressure motor 9 for an operating member 10 of the blade angle adjusting mechanism 5. Associated with the movable member 8 is a magnet 11 which, when deenergized, is moved into engagement with the member 8 by means of a closing spring 34 and causes the member 8 to be moved downwardly against the bias of an opening spring 12 until it engages a stop 13. When the movable member 8 is in this position, which is known as the shut down position of the governor 6, the operating member 10 is operated by the fluid motor 9 so that the blades of the propeller 4 are in their feathered or 90° position in which position the available wind has its minimum effect upon the propeller. Associated with the operating member 10 are the position switches 14–18, inclusive, which are respectively closed during different ranges of blade angles. For example, in the particular embodiment shown, it is assumed that the switch 14 is closed when the blade angle is 5° and above; the switch 15 is closed when the blade angle is 9° and above; the switch 16 is closed when the blade angle is 28° and above; the switch 17 is closed when the blade angle is 32° and below; and the switch 18 is closed when the blade angle is 90° and above.

When the magnet 11 is energized, the position of the movable member 8 is determined by the position of either the flyballs 7 or a cam 20 which is operated by means of a reversible motor 21. The position of the flyballs 7 for any given speed of the turbine 3 may be varied by adjusting the tension of the spring 7' by operating a reversible motor 22. Associated with the spring 7' are the position switches 23–26, inclusive, which are respectively arranged to be operated when the spring 7' is adjusted to cause the flyballs 7 to maintain a predetermined speed. For example, in the particular embodiment shown, it is assumed that the position switch 23 is closed when the spring 7' is adjusted to, or above, its 50% speed no load position. The position switch 24 is closed when the spring 7' is adjusted to, or above, its 90% speed no load position; the position switch 25 is closed when the spring 7' is adjusted to, or above, its 100% speed no load position; and the position switch 26 is closed when the spring 7' is adjusted to, or above, its 100% speed full load position.

Associated with the motor-operated cam 20 are the position switches 28–33, inclusive, which are respectively closed when the cam 20 is in certain positions to effect predetermined propeller blade angles. For example, in the particular embodiment shown, it is assumed that the position switch 28 is closed when the cam 20 is in a position to effect a blade angle of more than 5°; the position switch 29 is closed when the cam 20 is in a position to effect a blade angle of 5° or less; the position switch 30 is closed when the cam 20 is in a position to effect a blade angle of more than 30°; the position switch 31 is closed when the cam 20 is in a position to effect a blade angle of less than 30°; the position switch 32 is closed when the cam 20 is in a position to effect a blade angle of 90°, or more; and the position switch 33 is closed when the cam 20 is in a position to effect a blade angle of less than 90°.

When the plant 1 is shut down, the magnet 11 is deenergized so that the movable member 8 is moved to its shut down position by the closing spring 34, and the propeller blades are moved to their feathered or 90° position. During the normal operation, however, of the plant, the magnet 11 is energized so that the position of the movable member 8 depends upon the position of either the flyballs 7 or the cam 20 depending upon which is in a position to effect the larger blade angle.

As shown in the drawings, the governor mechanism is in the position it occupies after the plant 1 has been shut down due to a wind velocity of too small a value to operate the plant at a predetermined load. Under such conditions, the spring 7' is adjusted to between its 90% speed no load position and its 100% speed full load position, and the cam 20 is in a position to produce a predetermined blade angle such, for example, as 30°, which is a less efficient angle than the most efficient blade angle which, for the purpose of this description, is assumed to be 5°.

When the wind velocity increases to a sufficient value to operate the plant at a predetermined load, the speed of the turbine 3 increases to a sufficient value to operate a speed responsive switch 36, while the propeller blades are set at a 30° angle, and thereby complete an energizing circuit for a time relay 37 which, after being energized for a predetermined time, completes an energizing circuit for an associated control relay 38 if at the same time the voltage of the alternating current system 48, to which the generator 2 is to supply current, is sufficient to effect the operation of an associated voltage relay 67. The relay 38, when energized, completes an energizing circuit for the cam motor 21 so that the cam 20 is slowly moved from its 30° position to its 5° position in which position the cam position switch 28 is open, and the cam position switch 29 is closed. This change in the position of the cam 20 changes the position of the movable member 8 of the governor mechanism 6 so that the propeller blade angle is correspondingly decreased to a more efficient value and thereby causes the available wind to increase the speed of the turbine 3. When the turbine speed increases above a predetermined value, the voltage of a direct connected exciter 39 causes an exciter voltage relay 40, which is connected across the terminal of the exciter 39, to pick up and complete an energizing circuit for a time relay 41 if at the same time the spring 7' is adjusted to, or above, its 90% speed no load position so that the governor spring position switch 24 is closed, the cam 20 is in its 5° blade angle position so that the cam position switch 29 is closed and the actual blade angle is between 9° and 32° so that both of the blade angle position switches 15 and 17 are simultaneously closed.

After being energized for a predetermined time, the relay 41 completes an energizing circuit for a master relay 42 which, in turn, completes an energizing circuit for the operating winding 43 of a field switch 44 so that the field winding 45 of the generator 2 is connected across the terminals of the exciter 39. The closing of the field switch 44 also effects the energization of an associated control relay 46 as long as the circuit breaker 47, which is arranged to connect the generator 2 to the electric system 48, is open. The control relay 46 completes an energizing circuit for a synchronizing control relay 49 which, when energized, connects across the terminals of the generator 2 and the energized system 48 a differential frequency responsive means 50 of any suitable construction, examples of which are well known in the art, whereby the contacts 51 are closed when the frequency of the generator 2 is higher than the frequency of the system 48; the contacts 52 are closed when the frequency of the generator 2 is lower than the frequency of the system 48; and the contacts 53 and 54 are simultaneously closed when the frequencies of the generator 2 and of the system 48 are the same. The closing of the contacts 51 completes an energizing circuit for the spring adjusting motor 22 so that the spring 7' is adjusted to cause the flyballs 7 to hold a lower speed whereas the closing of the contacts 52 completes an energizing circuit for the motor 22 so that the spring 7' is adjusted to cause the flyballs 7 to hold a higher speed. When both of the contacts 53 and 54 are simultaneously closed, an energizing circuit is completed for a time relay 55 which renders operative an automatic synchronizer 56 of any suitable type so that it closes its contacts 57 when a predetermined phase relation exists between the voltages of the generator 2 and the system 48. The closing of the contacts 57 completes an energizing circuit for an associated control relay 58 which, in turn, completes an energizing circuit for the closing coil 59 of the circuit breaker 47 so that the generator 2 is connected to the system 48. The closing of the circuit breaker 47 also effects the deenergization of the control relays 46 and 49 so that the differential frequency responsive means 50 and the automatic synchronizer 56 are rendered inoperative. The closing of the circuit breaker 47 also effects the completion of an energizing circuit for the governor spring adjusting motor 22 so that the spring 7' is adjusted to cause the flyballs 7 to maintain a higher speed and thereby effect a decrease in the angle of the propeller blades and an increase in the output of the plant 1.

The output of the plant 1 is limited either by the power output of the generator 2 exceeding a predetermined value so that a power relay 60, which is connected so as to be responsive to the power output of the generator 2, opens its contacts 87, or by the blade angle of the propeller 4 being decreased to its minimum or most efficient angle, which is assumed to be 5°, so that the blade angle position switch 14 is opened.

During the normal operating range of wind velocities, such for example as the range between 30 and 60 miles per hour, the output of the plant 1 is controlled by the power relay 60 which is so arranged as to effect a decrease in the blade angle if the power output tends to decrease below a predetermined value and to effect an increase in the blade angle if the power output tends to increase above this predetermined value. It will be evident that, as the wind velocity increases, the governor 6 causes the blade angle to increase and as the wind velocity decreases, the governor 6 causes the blade angle to decrease. When the wind velocity exceeds a predetermined high value, such for example as 60 miles per hour, the blade angle increases to 28° or above so that the blade angle position switch 16 is closed and thereby completes an energizing circuit for a time relay 62. After being energized for a predetermined time, the relay 62 completes an energizing circuit for a control relay 63, which establishes independently of the position of the power relay 60, an energizing circuit for the governor spring adjusting motor 22 so that the spring 7' is adjusted to cause the governor 6 to increase the blade angle and thereby decrease the power output of the plant 1 until the power output decreases below a predetermined minimum value. Then a second power relay 65, which is connected so as to close its contacts whenever the power output of the generator 2 is below this predetermined minimum value, effects, by means of an associated control relay 66, the deenergization of the master relay 4. The relay 4, by opening its contacts, effects the opening of the circuit breaker 47 and the field switch 44.

The decrease in load on the prime mover effected by the operation of the governor spring adjusting motor 22 and the opening of the circuit breaker 47 causes the governor 6 to effect an increase in the blade angle so that it exceeds 32°. Therefore, as long as the wind velocity remains above a predetermined high value at no load, the blade angle position switch 17, which is in the energizing circuit of the relay 41, remains open. When, however, the wind velocity at no load decreases so that the governor reduces the blade angle below 32° and thereby causes the blade angle position switch 17 to close, an energizing circuit is completed for the time relay 41 which, after being energized for a predetermined time, completes an energizing circuit for the master relay 4. The differential frequency responsive means 50 and the automatic frequency syncronizer 56 then are rendered operative in the manner heretofore described to effect the automatic synchronization of the generator 2 with the system 48.

When the wind velocity decreases to such a low value that the governor 6 causes the blade angle to be reduced to 5°, the blade angle position switch 14, which is in the circuit of the motor 22, is opened to prevent a further increase in the load setting of the spring 7'. Therefore, if the wind velocity continues to decrease after the switch 14 is opened, a corresponding decrease in the power output of the plant 1 occurs until at a predetermined low wind velocity, the power relay 65 operates to effect the deenergization of the master relay 42 and the opening of the circuit breaker 47 and the field switch 44 in the manner heretofore described. When the wind velocity again increases to a sufficient value to cause the flyballs 7 to effect an increase in the blade angle above 9° so that the blade angle position switch 15 is closed, the time relay 41 is again energized to effect another automatic connection of the generator 2 to the system 48.

If, while the plant 1 is in operation, the voltage of the system 48 decreases below a predetermined value so that the voltage relay 67 returns to its deenergized position or the generator 2 falls out of step for any reason so that the contacts of an associated out-of-step relay 64 are closed, the relay 38 becomes deenergized and effects the deenergization of the master relay 42 and the opening of the circuit breaker 47 and the field switch 44. If the undervoltage relay 67 is the cause of the relay 38 becoming deenergized, a circuit is completed for the cam motor 21 to cause the cam 20 to be run to its 30° position when the cam position switch 31 is open. A circuit is also completed for the motor 22 so that it adjusts the spring 7' to its 100% speed no load position as determined by its position switch 25. If, however, the out-of-step relay 64 is the cause of the relay 38 becoming deenergized, the motor 22 is operated to adjust the spring 7' to its 100% speed no load position, but the motor 21 is not operated to cause the cam 20 to be moved to its 30° position because the relay 38, which controls the operating circuit of the motor 21, is reenergized as soon as the circuit breaker 47 opens.

In order to effect an emergency shut down of the plant 1 under certain emergency conditions, a lock-out relay 68 is provided. This relay is arranged to be energized in response to the closing of the contacts 69 of suitable protective devices, not shown, which are arranged to be operated in response to predetermined abnormal conditions of the plant. Preferably the lock-out relay 68 is of the type which has to be manually reset after each energization thereof. The operation of the lock-out relay 68 effects the immediate opening of the circuit breaker 47. As soon as the circuit breaker 47 opens under such conditions, an energizing circuit is completed for a control relay 70 which immediately completes an energizing circuit for an associated control relay 71, and which, after a predetermined time interval, completes an energizing circuit for another associated control relay 72. The relay 71, when energized, completes an energizing circuit for the spring-adjusting motor 22 so that the spring 7' is adjusted to its 50% speed no load position. The relay 72, when energized, effects the deenergization of the governor magnet 11 so that the closing spring 34 moves the movable member 8 to its shut down position thereby causing the propeller blades to be adjusted to their feathered, or 90°, position at which time the blade angle position switch 18 is closed to complete an energizing circuit for a control relay 74. The relay 72, when energized, also effects the operation of the cam motor 21 so that the cam 20 is also moved to its 90° position in which position the cam position switch 32 is closed to complete an energizing circuit for a control relay 75.

After the plant 1 has been shut down due to the occurrence of an emergency condition, the lock-out relay 68 may be reset manually at any time before the completion of the emergency shut down sequence without interrupting this sequence. However, as soon as the lock-out relay 68 is reset and the control relays 74 and 75 are energized due to the spring 7' being in its 50% speed no load position and the propeller blades being in their 90° position, the energizing circuits for the relays 70, 71 and 72 are opened. The deenergization of the relay 71 completes an energizing circuit for the cam motor 21 so that the cam 20 is then moved to its 30° position. The deenergization of the control relay 72 completes an energizing circuit for the governor magnet 11 so that the opening spring 12 can effect an opening movement of the movable member 8, but this opening movement is limited by the flyballs 7, the spring 7' of which is adjusted to its 50% speed no load position. In order to move the spring 7' from this position to or above its 90% speed no load position in which position an energizing circuit can be completed for the time relay 41, it is necessary to operate a two-position manually controlled transfer switch 76 from the position in which it is shown to its other position and then close another manually operated switch 82 so as to complete an energizing circuit for the spring-adjusting motor 22 for a sufficient length of time to adjust the spring 7' to or above its 90% speed no load position.

In order to prevent rotation of the turbine 3 by the wind when the plant is shut down, I also provide a suitable electrically controlled brake 78 which is arranged to be operated by the closing of a manually controlled switch 79 when the transfer switch 76 is in its non-automatic position and the circuit breaker 47 is open and the propeller blades are in their feathered, or 90° position. Also the energization of the brake 78 is arranged to complete an energizing circuit for the lock-out relay 68 to insure that the relays 68 and 70 cannot be reset as long as the brake is applied.

In order that the angle of the propeller blades may be manually controlled for test purposes while the brake 78 is applied, a control relay 80 is provided which is arranged to be energized by the movement of the transfer switch 76 to its other position if at the same time the relays 71, 74 and 75 are simultaneously energized. Relay 80, when energized, permits the spring-adjusting motor 22 to be controlled by the manually controlled switch 82 and the cam motor 21 to be controlled by the manually controlled switch 83.

The operation of the control arrangement shown in the drawings is as follows:

It will be assumed first that the electric system 48 is energized at normal voltage from some other source, not shown, and that the plant 1 has been shut down due to the wind velocity being too low. Under such conditions, the control devices are in the positions in which they are shown in the drawings. The voltage relay 67 is energized so that its contacts 85 are closed. An energizing circuit is completed for the governor magnet 11 through the contacts 86 of the relay 72. The cam 20, which is in its 30° position, maintains the movable member 8 of the governor 6 in such a position that the propeller blades are in their 30° position and the spring 7' is adjusted to above its 90% speed no load position. Therefore, under the assumed conditions, the blade angle position switches 14–17, inclusive; the governor spring position switches 23, 24, and 26; and the cam position switches 28 and 33 are closed, and the blade angle position switch 18; the governor spring position switches 25; and the cam position switches 29–32, inclusive, are open. An energizing circuit is completed for the control relay 61 through the contacts 87 of the power relay 60, and an energizing circuit is completed for a control relay 89 through the auxiliary contacts 90 of the open circuit breaker 47.

When the wind velocity increases above a predetermined value, which is sufficient to cause the output of the plant 1 to exceed a predetermined value, the wind increases the speed of the turbine 3 to a sufficient value to cause the speed switch 36 to close its contacts 91 and complete an energizing circuit for the time relay 37. After being energized for a predetermined time, the relay 37 closes its contacts 92 and completes an energizing circuit for the relay 38 through the contacts 65 of the voltage relay 67, the resistor 93, the contacts 94 of the relay 71 and the contacts 95 of the lock-out relay 68. The closing of the contacts 96 of the relay 38 completes a shunt circuit around the contacts 85 of the relay 67. The closing of the contacts 97 of the relay 38 completes an energizing circuit through the armature 98 and the field winding 99 of the cam motor 21, the cam position switch 28 and the contacts 100 of the relay 71 so that the motor 21 operates the cam 20 in such a manner as to effect a decrease in the propeller blade angle. This energizing circuit for the motor 21 is maintained until the cam 20 is moved to its 5° position when the cam position switch 28 is open and the cam position switch 29 is closed. As soon as the cam 20 moves out of its 30° position, the cam position switch 31 is closed. The propeller blade angle follows the position of the cam 20 while the turbine speed is below the setting of the spring 7', but when the turbine speed increases above this value, the flyballs 7 then control the position of the movable member 8 which, in turn, controls the angle of the propeller blades.

As the turbine speed increases due to the decrease in the blade angle, the voltage of the shunt exciter 39 builds up, and when the turbine speed reaches a predetermined value, the exciter voltage is sufficient to cause the exciter voltage relay 40, which is connected across the exciter terminals by the contacts 77 of the master relay 42, to close its contacts 101. The closing of the contacts 101 completes an energizing circuit for the time relay 41 through the governor-spring position switch 24, the cam position switch 29, which is closed when the cam 20 reaches its 5° position, the blade angle position switches 15 and 17 both of which are closed if the blade angle is within the range of 9–32° and the contacts 102 of the relay 38. After being energized for a predetermined time, the relay 41 closes its contacts 103 and completes an energizing circuit for the master relay 42 through the contacts 95 of the lock-out relay 68, the contacts 94 of the relay 71, the contacts 104 of the transfer switch 76, and the contacts 102 of the relay 38. The closing of the contacts 104a of the master relay 42 completes a shunt circuit around the contacts 103 of the relay 41. This shunt circuit also includes, in parallel, the contacts 105 of the relay 66, and the contacts 106 of the relay 63. The closing of the contacts 107 of the master relay 42 completes an energizing circuit for the operating winding 43 of the field switch 44 through the contacts 150 of the lock-out relay 68 so that the generator field winding 45 is excited from the exciter 39. The closing of the auxiliary contacts 108 on the field switch 44 completes an energizing circuit for the control relay 46 through the contacts 109 of the relay 42 and the auxiliary contacts 110 on the open circuit breaker 47. The closing of the contacts 111 of the relay 46 completes an energizing circuit for the control relay 49 through the contacts 112 of the master relay 42 and the auxiliary contacts 113 on the open circuit breaker 47. The closing of the contacts 114 of the relay 49 completes a shunt circuit around the contacts 111 of the relay 46. The closing of the contacts 115 and 116 of the relay 49 connects the differential frequency responsive means 50 to the system 48 and the generator 2 so that it responds to the frequency difference thereof. If the frequency of the generator 2 is below the frequency of the system 48, the contacts 52 are closed so as to complete an energizing circuit for the spring-adjusting motor 22 through the contacts 117 of the relay 71, the contacts 166 of the transfer switch 76, the contacts 120 of the relay 63, the governor-spring position switch 26 and the field winding 118 and the armature 119 of the motor 22. This energizing circuit for the motor 22 causes it to adjust the spring 7' so as to effect an increase in the speed of the turbine 3 and the generator 2. If the frequency of the generator 2 is above the frequency of the system 48, the contacts 5' are closed so as to complete an energizing circuit for the spring adjusting motor 22 through the contacts 117 of the relay 71, the contacts 166 of the transfer switch 76, the governor-spring position switch 25 and the field winding 121 and the armature 119 of the motor 22 so that the motor 22 adjusts the spring 7' in such a manner as to effect a decrease in the speed of the turbine 3 and the generator 2.

When the frequencies of the generator 2 and the system 48 are the same, the contacts 53 and 54 of the differential frequency responsive means 50 are simultaneously closed so as to complete an energizing circuit for the time relay 55. When the time relay 55 closes its contacts 122 and 123, it connects the automatic synchronizer 56 to the generator 2 and the system 48 so that, as soon as the proper phase relation exists thereafter between the voltages of the generator 2 and the system 48, the automatic synchronizer 56 closes its contacts 57 and completes an energizing circuit for the control relay 58 through the auxiliary contacts 124 on the circuit breaker 47 and the contacts 125 of the master relay 42. The closing of the contacts 126 of the control relay 58 completes an energizing circuit for the closing coil 59 of the circuit breaker 47 to effect the closing thereof so that the generator 2 is connected to the system 48 and operates in synchronism therewith. As soon as the circuit breaker 47 closes, the out-of-step relay 64 opens its contacts 151 before the time relay 89, which is deenergized by the opening of the auxiliary contacts 90 on the circuit breaker 47, can close its contacts 152. The contacts 151 and 152 are in series in a shunt circuit around the winding of the relay 38.

The opening of the auxiliary contacts 110, 113 and 124 on the circuit breaker 47 effects the deenergization of the control relays 46, 49, 55 and 58 and renders the differential frequency responsive means 50 and the automatic synchronizer 56 inoperative. The closing of the auxiliary contacts 180 and 181 on the circuit breaker 47 respectively completes shunt circuits around the contacts 92 of the relay 37 and the contacts 107 of the relay 42.

As soon as the auxiliary contacts 127 on the circuit breaker 47 are closed, an energizing circuit is completed for the spring-adjusting motor 22 through the contacts 117 of the relay 71, the contact 166 of the transfer switch 76, the contacts 128 of the control relay 61, the blade angle position switch 14, the contacts 129 of the relay 63, the governor-spring position switch 26, and the field winding 118 and the armature 119 of the motor 22. This energizing circuit causes the motor 22 to adjust the spring 7' so as to effect a decrease in the blade angle of the propeller which, in turn, effects an increase in the output of the plant 1 until it reaches a value at which the power relay 60 opens its contacts 87 and thereby effects the deenergization of the control relay 61. When the power output of the plant 1 exceeds the setting of the power relay 60, this relay closes its contacts 130 and completes an energizing circuit for a control relay 131 which, by closing its contacts 132, completes an energizing circuit for the spring-adjusting motor 22 through the contacts 117 of the relay 71, the contact 166 of the transfer switch 76, the auxiliary contacts 127 on the closed circuit breaker 47, the governor-spring position switch 25, and the field winding 121 and the armature 119 of the motor 22. This energizing circuit causes the motor 22 to adjust the spring 7' so as to effect an increase in the blade angle of the propeller which, in turn, decreases the output of plant 1. Therefore, during a predetermined range of wind velocities, the power relay 60 controls the blade angle of the propeller 4 so that the plant 1 supplies a predetermined output to the system 48. It will be noted that, as the wind velocity increases, the blade angle is increased to maintain the output at the desired value and that, as the wind velocity decreases, the blade angle is decreased to maintain the output at the desired value.

When the wind velocity exceeds a predetermined value, the governing mechanism causes the blade angle to exceed 28° so that the blade angle position switch 16 is closed and completes an energizing circuit for the time relay 62 through the auxiliary contacts 133 on the closed circuit breaker 47. After being energized for a predetermined time, the relay 62 closes its contacts 134 and completes an energizing circuit for the control relay 63 through the auxiliary contacts 133 on the circuit breaker 47. The closing of the contacts 135 of the relay 63 completes a shunt circuit around the auxiliary contacts 127 on the circuit breaker 47 and the contacts 132 of the relay 131 so that the field winding 121 and the armature 119 of the motor 22 are energized to cause the motor 22 to adjust the spring 7' towards its 100% speed no load position thereby causing the blade angle of the propeller to be increased and the output of the plant 1 to be decreased. This operating circuit for the spring-adjusting motor 22 also includes the contacts 117 of the relay 71, the contact 166 of the transfer switch 76, and the governor-spring position switch 25. When the blade angle is increased to 32°, or above, the blade angle position switch 17 in the circuit of the time relay 41 is opened so that the relay 41 opens its contacts 103 in the original energizing circuit of the master relay 42. When the power output of the generator 2 decreases below the setting of the power relay 65 so that it closes its contacts 136, an energizing circuit is completed for the control relay 66 through the auxiliary contacts 133 on the circuit breaker 47. The closing of the contacts 143 of the relay 66 completes a shunt circuit around the blade angle position switch 16 in the energizing circuit of the relay 62. The simultaneous opening of the contacts 106 of the relay 63, the contacts 105 of the relay 66 and the contacts 103 of the relay 41 effects the deenergization of the master relay 42 which, in turn, by closing its contacts 138, completes an energizing circuit for the trip coil 139 of the circuit breaker 47 through the contacts 140 of the relay 66 and the auxiliary contacts 141 on the circuit breaker 47 so that the generator 2 is disconnected from the system 48. The opening of the auxiliary contacts 181 on the circuit breaker 47 interrupts the energizing circuit for the operating winding 43 of the field switch 44 so that the generator field winding 45 is disconnected from the exciter 39. The closing of the contacts 148 of the master relay 42 completes a shunt circuit around the contacts 135 of the relay 63 in the circuit of the field winding 121 and the armature 119 of the motor 22 so as to insure that the spring 7' is adjusted to a position below its 100% speed no load position.

The opening of the auxiliary contacts 133 on the circuit breaker 47 effects the deenergization of the control relays 62, 63 and 66. Since, however, the speed of the turbine 3, which is being controlled by the flyballs 7, is sufficient to maintain the speed switch contacts 91 closed under these excessive wind conditions, the relays 37 and 38 are still energized.

When the wind velocity decreases so that the blade angle, as a result of the operation of the flyballs 7, is again decreased below 32° and the blade angle position switch 17 is closed, the circuit of the master relay 42 is again completed in the manner heretofore described so that the control apparatus operates automatically to place the plant 1 in service and cause it to supply power to the system 48.

When the plant 1 is in service and the wind velocity decreases below a predetermined value, the output of the plant decreases below the setting of the power relay 65 even though the propeller blade angle is adjusted to its most efficient angle of 5°. The closing of the contacts 136 of the power relay 65 under these low wind conditions effects in the manner heretofore described the successive energizations of the control relays 66, 62 and 63 and the deenergization of the master relay 42 which, in turn, effects the opening of the circuit breaker 47 and of the field switch 44 and effects the adjustment of the spring 7' to below its 100% speed no load position. If the wind velocity decreases to a sufficiently low value, the speed of the turbine decreases to a sufficiently low value to cause the speed switch 36 to open its contacts 91 and effect the deenergization of the control relays 37 and 38. The closing of the contacts 144 of the relay 38 under such conditions completes an energizing circuit for the cam motor 21 so that the cam 20 is moved from its 5° position to its 30° position. This energizing circuit for the motor 21 also includes the contacts 145 of the transfer switch 76, the contacts 146 of the relay 80, the cam position switches 31 and 33 and the field winding 147 and the armature 98 of the motor 21. The plant 1 is then in the condition heretofore assumed at the beginning of the description of the operation.

If, while the plant 1 is in operation, the voltage of the system 48 should for any reason decrease below the drop-out value of the voltage relay 67 so that it closes its contacts 153, a shunt circuit is then completed around the winding of the relay 38. The closing of the contacts 154 of the relay 38 completes an energizing circuit for the trip coil 139 of the circuit breaker 47 through the auxiliary contacts 141 on the circuit breaker. The opening of the contacts 102 of the relay 38 interrupts the energizing circuits of the relays 41 and 42 so that the cam 20 is moved to its 30° position and the spring 7' is adjusted below its 100% speed no load position in the manner heretofore described. When normal voltage is restored on the system 48, the relay 67 again closes its contacts 85 and the relay 38 then becomes energized and causes the control apparatus to operate automatically to place the plant 1 in service in the manner heretofore described.

If, while the plant 1 is in operation, the generator 2 is pulled out of synchronism for any reason, the out-of-step relay 64 closes its contacts 151 and completes, in series with the contacts 152 of the control relay 89, a shunt circuit around the winding of the relay 38 which then effects the shutting down of the plant 1 in the same manner as when a failure of the system voltage occurs except that, as soon as the circuit breaker 47 is opened, the circuit of the relay 38 is re-established since the shunt circuit around its winding is interrupted by the relay 89 opening its contacts 152. The immediate opening of the contacts 144 of the relay 38 prevents the energizing circuit of the cam motor 21 from being completed for a sufficient length of time to move the cam to its 30° position. The re-energization of the relay 38 then causes the control apparatus to place the plant 1 in operation in the manner heretofore described.

If, while the plant 1 is in operation, an emergency condition occurs so that the contacts 69 of any one of the emergency condition responsive means are closed, an energizing circuit is completed for the lock-out relay 68. The closing of the contacts 157 of the lock-out relay 68 immediately completes an energizing circuit for the trip coil 139 of the circuit breaker 47 through the auxiliary contacts 141 on the circuit breaker 47 so that the generator 2 is disconnected from the system 48. The opening of the contacts 150 of the lock-out relay 68 interrupts the energizing circuit of the closing coil 43 of the field switch 44 so that the generator field winding 45 is disconnected from the exciter 39. The closing of the auxiliary contacts 156 on the circuit breaker 47 completes an energizing circuit for the time relay 70 through the contacts 155 of the lockout relay 68. The immediate closing of the contacts 158 of the relay 70 completes an energizing circuit for the control relay 71. The closing of the contacts 159 of the relay 71 completes through the contacts 160 of the relay 80 and the governor-spring position switch 23 an energizing circuit for the field winding 121 and the armature 119 of the spring-adjusting motor 22 so that the spring 7' is adjusted to its 50% speed no load setting. The closing of the contacts 163 of the relay 71 completes another circuit for the relay 70 through the parallel connected contacts 164 and 165 of the relays 74 and 75 respectively.

After the relay 70 has been energized for a predetermined time, it closes its contacts 161 and completes an energizing circuit for the relay 72. The opening of the contacts 86 of the relay 72 interrupts the energizing circuit of the governor magnet 11 so that the closing spring 34 operates the movable member 8 to its shut down position and thereby causes the propeller blades to be moved to their feathered, or 90°, position. The closing of the contacts 162 of the relay 72 completes, through the contacts 145 of the transfer switch 76, the contacts 146 of the relay 80 and the cam position switch 33, an energizing circuit for the field winding 147 and the armature 98 of the cam motor 21 which causes the cam 20 to be moved to its 90° position.

When the propeller blades reach their feathered, or 90°, position so that the blade angle position switch 18 is closed, an energizing circuit is completed for the control relay 74. When the cam 20 is in its 90° position, the cam position switch 32 completes an energizing circuit for the control relay 75.

In order to restore normal operation of the plant 1 after an emergency shut down thereof, it is necessary to reset the lock-out relay 68 manually. With the lock-out relay 68 in its reset position and the relays 74 and 75 energized, the energizing circuit for the relay 70 is open so that it, in turn, effects the deenergization of the relays 71 and 72. The closing of the contacts 86 of the relay 72 re-establishes the energizing circuit for the governor magnet 11 so that the position of the cam 20 controls the position of the movable member 8 of the governor 6. The closing of the contacts 100 of the relay 71 completes through the cam position switches 30 and 28, a circuit for the field winding 99 and armature winding 98 of cam motor 21 to move the cam 20 from its 90° position to its 30° position. In this manner the equipment is returned to its normal starting condition except that the spring 7' is still adjusted to its 50% speed no load position. In order to restore the spring 7' to above its 90% speed no load setting, which is the position it must be in to allow the relay 38 to be energized, it is necessary to move the transfer switch 76 manually to its other position and to operate the manually controlled switch 82, while the switch 76 is in this other position in such a manner as to complete the energizing circuit for the field winding 113 and the armature 119 of the motor 22 for a sufficient length of time to allow the motor 22 to adjust the spring 7' to, or above, its 90% speed no load setting. This energizing circuit for the motor 22 also includes the governor-spring contacts 26 and the contacts 117 of the relay 71. The restoration of the transfer switch 76 to the position in which it is shown after the spring 7' has been adjusted to its 90% speed no load position re-establishes the necessary connections for the relay 38 so that it can be energized to effect the starting up of the plant as soon as the wind velocity is high enough to effect the energization of the control relay 37.

When it is desired to apply the brake 78, an emergency shut down is effected by operating the lock-out relay 68 in any desired manner. Then the transfer switch 76 is moved to its other position, and a control switch 79 is closed so as to complete an energizing circuit for the brake 78 through the contacts 168 of the transfer switch 76, the contacts 169 of the relay 74 and the auxiliary contacts 90 on the open circuit breaker 47. The closing of the auxiliary contacts 170 on the brake 78 completes a shunt circuit around the parallel connected contacts 164 and 165 of the relays 74 and 75, respectively, and the closing of the contacts 171 on the brake 78 completes an energizing circuit for the lock-out relay 68 so that the resetting of the lock-out relay 68 or the deenergization of the control relay 70 cannot be effected as long as the brake 78 is applied. The closing of the contacts 182 on the brake completes a shunt circuit around the contacts 169 of the relay 74 so that the deenergization of the relay 74 cannot effect the release of the brake.

When the transfer switch 76 is moved to its other position while the plant 1 is shut down and the lock-out relay 68 is in its lock-out position, an energizing circuit is completed for the control relay 80 through the contacts 172 of the relay 75, the contacts 173 of the relay 74, the contacts 174 of the relay 71 and the contacts 175 of the transfer switch 76. The closing of the contacts 176 of the relay 80 completes an energizing circuit for the governor magnet 11, and the closing of the contacts 177 of the relay 80 completes a shunt circuit around the series connected contacts 172 and 173. The closing of the contacts 178 of the relay 80 renders the manually controlled switch 82 operative to control the operation of the spring-adjusting motor 22 so that the setting of the spring 7' may be adjusted at any desired value for testing purposes. The closing of the contacts 178 also renders the manually controlled switch 83 operative to control the cam motor 21 so that the position of the cam 20 can be adjusted to any desired value for testing purposes. In order to restore normal automatic operation of the control apparatus, it is merely necessary to restore the transfer switch 76 to the position in which it is shown and to reset the lock-out relay 68.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, an alternating current generator having a field winding, a fluid driven prime mover for said generator having a driving propeller which is subjected to fluid of variable velocity, means for varying the blade angle of said propeller, an energized electric system, means operative when the velocity of the driving fluid for said prime mover is below a predetermined value for causing said blade angle varying means to adjust the propeller blade angle to a predetermined inefficient value, an exciter driven by said prime mover, means responsive to a predetermined subnormal speed of said prime mover while the blade angle is at said predetermined inefficient value for causing said blade angle varying means to change the blade angle towards its most efficient value thereby effecting an increase in speed of said prime mover, means dependent upon the exciter voltage building up to a predetermined value for connecting said generator to said system.

2. In combination, an alternating current generator having a field winding, a fluid driven prime mover for said generator having a driving propeller which is subjected to fluid of variable velocity, means for varying the blade angle of said propeller, an energized electric system, means operative when the velocity of the driving fluid for said prime mover is below a predetermined value for causing said blade angle varying means to adjust the propeller blade angle to a predetermined inefficient value, an exciter driven by said prime mover, means responsive to a predetermined subnormal speed of said prime mover while the blade angle is at said predetermined inefficient value for causing said blade angle varying means to change the blade angle towards its most efficient value thereby effecting an increase in speed of said prime mover, means dependent upon the exciter voltage building up to a predetermined value and the propeller blade angle being within a predetermined range below its most efficient value for connecting said generator to said system.

3. In combination, an alternating current generator having a field winding, a fluid driven prime mover for said generator having a driving propeller which is subjected to fluid of variable velocity, means for varying the blade angle of said propeller, an energized electric system, means operative when the velocity of the driving fluid for said prime mover is below a predetermined value for causing said blade angle varying means to adjust the propeller blade angle to a predetermined inefficient value, an exciter driven by said prime mover, means responsive to a predetermined subnormal speed of said prime mover while the blade angle is at said predetermined inefficient value for causing said blade angle varying means to change the blade angle towards its most efficient value thereby effecting an increase in speed of said prime mover, automatic synchronizing means for connecting said generator to said system, and means dependent upon the exciter voltage building up to a predetermined value for rendering said automatic synchronizing means operative.

4. In combination, an alternating current generator having a field winding, a fluid driven prime mover for said generator having a driving propeller which is subjected to fluid of variable velocity, means for varying the blade angle of said propeller, an energized electric system, means operative when the velocity of the driving fluid for said prime mover is below a predetermined value for causing said blade angle varying means to adjust the propeller blade angle to a predetermined inefficient value, an exciter driven by said prime mover, means responsive to a predetermined subnormal speed of said prime mover while the blade angle is at said predetermined inefficient value for causing said blade angle varying means to change the blade angle towards its most efficient value thereby effecting an increase in speed of said prime mover, automatic synchronizing means for connecting said generator to said system, and means dependent upon the exciter voltage building up to a predetermined value and the propeller blade angle being within a predetermined range below its most efficient value for rendering said automatic synchronizing means operative.

5. In combination, an alternating current generator having a field winding, a fluid driven prime mover for said generator having a driving propeller which is subjected to fluid of variable velocity, means for varying the blade angle of said propeller, an energized electric system, means operative when the velocity of the driving fluid for said prime mover is below a predetermined value for causing said blade angle varying means to adjust the propeller blade angle to a predetermined inefficient value, an exciter driven by said prime mover, means responsive to a predetermined subnormal speed of said prime mover while the blade angle is at said predetermined inefficient value for causing said blade angle varying means to change the blade angle towards its most efficient value thereby effecting an increase in speed of said prime mover, means dependent upon the speed of said prime mover increasing to a predetermined value for exciting said generator field winding from said exciter, means responsive to the relative frequencies of said generator and system for controlling said blade angle varying means to decrease the difference between said frequencies, and means for automatically synchronizing said generator with said system when the frequency difference is below a predetermined value.

6. In combination, an alternating current system, a generator connected to said system, a fluid driven prime mover for said generator having a driving propeller which is subjected to a fluid of variable velocity, means for varying the blade angle of said propeller, means responsive to the power output of said generator for regulating said blade angle varying means to maintain the power output at a predetermined value during a predetermined range of velocities of the driving fluid, means responsive to a blade angle above a predetermined value for effecting the operation of said blade angle varying means to decrease the power output of said generator and for preventing said power output responsive means from regulating said blade angle varying means so as to increase the power output of said generator, and means responsive to the power output of said generator decreasing below a predetermined value for effecting the disconnection of said generator from said system.

7. In combination, an alternating current system, a generator connected to said system, a fluid driven prime mover for said generator having a driving propeller which is subjected to a fluid of variable velocity, means for varying the blade angle of said propeller, means responsive to the power output of said generator for regulating said blade angle varying means to maintain the power output at a predetermined value during a predetermined range of velocities of the driving fluid, means responsive to a blade angle below a predetermined value for rendering said power output responsive means inoperative to decrease the blade angle further, means responsive to the power output of said generator decreasing below a predetermined value for effecting the disconnection of said generator from said system, and means responsive to a blade angle above a predetermined value for effecting the operation of said blade angle varying means to decrease the power output of said generator.

8. In combination, an alternating current system, a generator connected to said system, a fluid driven prime mover for said generator having a driving propeller which is subjected to a fluid of variable velocity, means for varying the blade angle of said propeller, means responsive to the power output of said generator for regulating said blade angle varying means to maintain the power output at a predetermined value during a predetermined range of velocities of the driving fluid, means responsive to a decrease in the power output of said generator below a predetermined value for effecting the disconnection of said generator from said system, and means for controlling said blade angle varying means under predetermined high and low velocities of the driving fluid so as to decrease the power output of said generator below said last mentioned predetermined value.

9. In combination, an alternating current system, a generator connected to said system, a fluid driven prime mover for said generator having a driving propeller which is subjected to a fluid of variable velocity, means for varying the blade angle of said propeller, means responsive to the power output of said generator for regulating said blade angle varying means to maintain the power output at a predetermined value during a predetermined range of velocities of the driving fluid, means responsive to a decrease in the power output of said generator below a predetermined value for effecting the disconnection of said generator from said system, and means for controlling said blade angle varying means under predetermined high velocities of the driving fluid so as to decrease the power output of said generator below said last mentioned predetermined value.

HERMAN BANY.